United States Patent
Math et al.

(10) Patent No.: US 10,876,927 B2
(45) Date of Patent: Dec. 29, 2020

(54) SYSTEM AND METHOD FOR IMPROVED JOURNAL BEARING OPERATIONS

(71) Applicant: AI ALPINE US BIDCO INC, Wilmington, DE (US)

(72) Inventors: Souvik Math, Karnataka (IN); Hombe Gowda, Karnataka (IN); Krishnanand Venkatasubramanian, Karnataka (IN)

(73) Assignee: AI ALPINE US BIDCO INC, Wilmington, DE (US)

( * ) Notice: Subject to any disclaimer, the term of this patent is extended or adjusted under 35 U.S.C. 154(b) by 268 days.

(21) Appl. No.: 16/063,386

(22) PCT Filed: Nov. 30, 2016

(86) PCT No.: PCT/US2016/064134
§ 371 (c)(1),
(2) Date: Jun. 18, 2018

(87) PCT Pub. No.: WO2017/105839
PCT Pub. Date: Jun. 22, 2017

(65) Prior Publication Data
US 2018/0372585 A1    Dec. 27, 2018

(30) Foreign Application Priority Data
Dec. 18, 2015  (IN) ............................ 6773/CHE/2015

(51) Int. Cl.
*G01M 13/04* (2019.01)
*G05B 15/02* (2006.01)
*G06F 17/18* (2006.01)

(52) U.S. Cl.
CPC ............. *G01M 13/04* (2013.01); *G05B 15/02* (2013.01); *G06F 17/18* (2013.01)

(58) Field of Classification Search
CPC ......... G01M 13/04; G05B 15/02; G06F 17/18
See application file for complete search history.

(56) References Cited

U.S. PATENT DOCUMENTS

| | | | |
|---|---|---|---|
| 2007/0124183 A1* | 5/2007 | Williams | F02D 41/1401 701/103 |
| 2010/0180664 A1 | 7/2010 | Wilhelmy et al. | |
| 2015/0082871 A1* | 3/2015 | Zha | G01N 33/2888 73/53.05 |

FOREIGN PATENT DOCUMENTS

| | | |
|---|---|---|
| CN | 102589885 A | 7/2012 |
| EP | 1731893 A1 | 12/2006 |
| WO | 2009/138106 A1 | 11/2009 |

OTHER PUBLICATIONS

International Search Report and Written Opinion issued in connection with corresponding PCT Application No. PCT/US2016/064134 dated May 17, 2017.

(Continued)

*Primary Examiner* — Suman K Nath
(74) *Attorney, Agent, or Firm* — Fletcher Yoder, P.C.

(57) ABSTRACT

A method (60, 90) includes executing a wear protocol to derive a start-stop (SS) wear, a steady-state operating hours (OH) wear, or a combination thereof, of a test journal bearing system (10). The method (60, 90) further includes observing operations of an engine (8) via one or more sensors to determine a number of start-stops, steady-state operating hours, or a combination thereof. The method (60, 90) also includes determining a determined journal bearing system wear (114) based on applying a physics-based model (94) of a journal bearing system (10) and the transfer function to the number of start-stops, the steady-state operating hours, or to the combination thereof. The method (60, 90) additionally includes executing one or more actionable items (116) on the engine (8) based on the determined journal bearing system wear (114).

20 Claims, 7 Drawing Sheets

(56) References Cited

OTHER PUBLICATIONS

International Preliminary Report on Patentability issued in connection with corresponding PCT Application No. PCT/US2016/064134 dated Jun. 19, 2018.

* cited by examiner

SYSTEM AND METHOD FOR IMPROVED JOURNAL BEARING OPERATIONS

BACKGROUND

The subject matter disclosed herein relates to journal bearings systems, and to systems and methods for improved operations of journal bearings systems.

Machinery and equipment often include components (e.g., rotating or moving components) that need support during operation. This support may be provided by bearings or similar devices. For example, certain power production equipment, such as reciprocating engines coupled to electrical generators may include a variety of bearing supporting moving components. In certain applications, the bearings include direct contact journal bearings systems used to support the moving component. It may be useful to improve journal bearing system operations.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a method that includes executing a wear protocol to derive a start-stop (SS) wear, a steady-state operating hours (OH) wear, or a combination thereof, of a test journal bearing system. The method further includes observing operations of an engine via one or more sensors to derive a number of start-stops, steady-state operating hours, or a combination thereof. The method also includes determining a determined journal bearing system wear based on applying a physics-based model of a journal bearing system and the transfer function to the number of start-stops, the steady-state operating hours, or to the combination thereof. The method additionally includes executing one or more actionable items on the engine based on the determined journal bearing system wear.

A second embodiment provides a system that includes an electronic control unit (ECU) having one or both of a memory or storage device storing one or more processor-executable executable routines, and one or more processors configured to execute the one or more executable routines which, when executed, cause acts to be performed. The acts to be performed include controlling operations of an engine. The acts to be performed further include observing operations of the engine via one or more sensors to derive a number of start-stops, steady-state operating hours, or a combination thereof. The acts to be performed also include determining a determined journal bearing system wear based on applying a physics-based model of a journal bearing system and a transfer function to the number of start-stops, the steady-state operating hours, or to the combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed towards systems and methods for improving journal bearing life and maintenance of journal bearings. In one embodiment, a model is constructed, which may advantageously include at least one transfer function and at least one physics-based journal bearing model. The transfer function may combine journal bearing wear and tear information due to both start-stop engine operations as well as steady state engine operations. Indeed, each transfer function may include both start-stop as well as steady state effects suitable for then predicting an amount of wear for a specific type of journal bearing. In certain embodiments, the transfer function may be created by capturing data in situ from one or more engines in the field. The data may then be processed as described in more detail below to derive the one or more transfer functions, as well as to derive certain calibration coefficients useful in calibrating the model to more accurately derive wear and tear based on observed field conditions.

Accordingly, the transfer functions may be applied to field wear and can separate out wear due to start-stop and steady running conditions. The physics based journal bearing model may additionally calculate bearing wear separately, including the wear due to the start stop and steady running conditions. The physics based journal bearing model may be calibrated and validated using test rig data and/or field wear data. Thus a difference between model predictive bearing wear and field bearing wear may be small (e.g., within +/−7%). The calibrated model can then predict total bearing wear due to start-stop conditions, steady state conditions, or combination thereof for certain inputs (e.g., engine load, engine speed, operating temperatures, bearing architecture, lube/oil properties, or a combination thereof). Advantageously, the engine may be observed during operations, and journal bearing wear predicted. The predicted wear may then be applied to improve journal bearing life and maintenance, for example, by issuing alerts or maintenance schedules that would eliminate or minimize undesired maintenance events.

It may be beneficial to describe a system that may include one or more journal bearings. Accordingly, turning now to the drawings and referring to FIG. 1, the figure illustrates a block diagram of an embodiment of a portion of an engine driven power generation system 8 having one or more journal bearing systems 10. More specifically, the one or more journal bearing systems 10 are disposed in an engine 11 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide an oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 11, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

Figure 1:
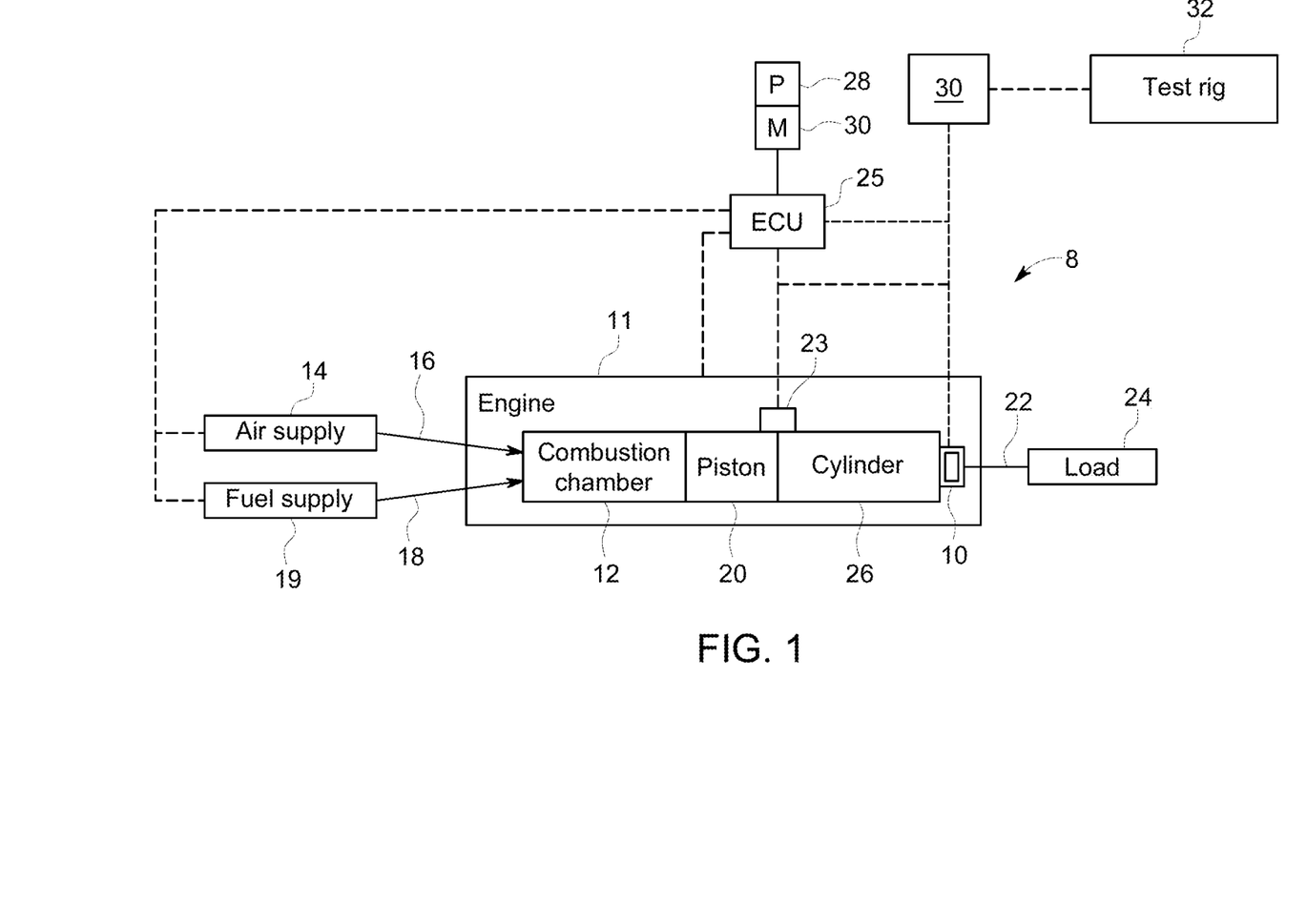
FIG. 1 is a block diagram of an embodiment of a portion of an engine driven power generation system having one or more journal bearing systems, in accordance with aspects of the present disclosure.

The system 8 disclosed herein may be adapted for use in stationary applications (e.g., in industrial power generating engines) or in mobile applications (e.g., in cars or aircraft). The engine 11 may be a two-stroke engine, three-stroke engine, four-stroke engine, five-stroke engine, six-stroke engine, or more. The engine 11 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. The system 8 may generate power ranging from 10 kW to 10 MW. In some embodiments, the engine 11 may operate at less than approximately 1800 revolutions per minute (RPM). In some embodiments, the engine 11 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 11 may operate between approximately 750-2000 RPM, 900-1800 RPM, or 1000-1600 RPM. In some embodiments, the engine 11 may operate at approximately 1800 RPM, 1500 RPM, 1200 RPM, 1000 RPM, or 900 RPM. Exemplary engines 11 may include General Electric Company's Jenbacher Engines (e.g., Jenbacher J624, Type 2, Type 3, Type 4, Type 6, or J920 FleXtra) or Waukesha Engines (e.g., Waukesha VGF, VHP, APG, 275GL), for example.

The driven power generation system 8 may include one or more sensors 23 suitable for detecting a variety of engine conditions, such as engine load, engine speed, operating temperatures, bearing lube/oil properties, and so on. The sensors 23 may additionally sense fluid flows (e.g., fuel flows, exhaust flows, O2 compositions) pressures, component temperatures, vibration, clearances between rotating and stationary components and so on. The sensors 23 are shown communicatively coupled to an engine control unit (ECU) 25. The ECU 25 may include one or more processors 28 and a memory 30. During operations, signals from the sensors 23 are communicated to the ECU 25 to determine a variety of conditions (e.g., pinging, fuel flow, exhaust flow, speed, valve timing, and so on). The ECU 25 may then adjust certain engine 11 parameters to control the engine 11. For example, the ECU 25 may adjust ignition timing, adjust boost pressure, valve timing, fuel flows, air flows, exhaust flows, and so on.

As further described herein, the ECU 25 may include one or more models and transfer functions suitable for deriving journal bearing system 10 conditions. For example, the ECU 25 may derive approximate wear, remaining life, maintenance schedules, and so on, for the journal bearing system 10 and related components. Additionally or alternatively, an external computing system 30 may also be communicatively coupled to the engine system 8. In one embodiment, the external computing system 30 may be included as a component of a test rig system 32. The external computing system 32 may thus receive data from the engine system 8, including engine logs and/or real time data, to derive journal bearing system 10 transfer functions using certain techniques described in more detail below. The test rig system 32 may include testing embodiments of the power production system 8, including test benches suitable for testing wear and tear on the journal bearing systems 10, sensor systems (e.g., microscopes) to observe the wear and tear, and so on. In some embodiments, the journal bearing system 10 may be an instrumented journal bearing that may transmit (wired or wirelessly) data regarding temperatures, oil flow rates, oil properties (e.g., viscosity, contaminants), journal speed, and the like.

Figure 2:
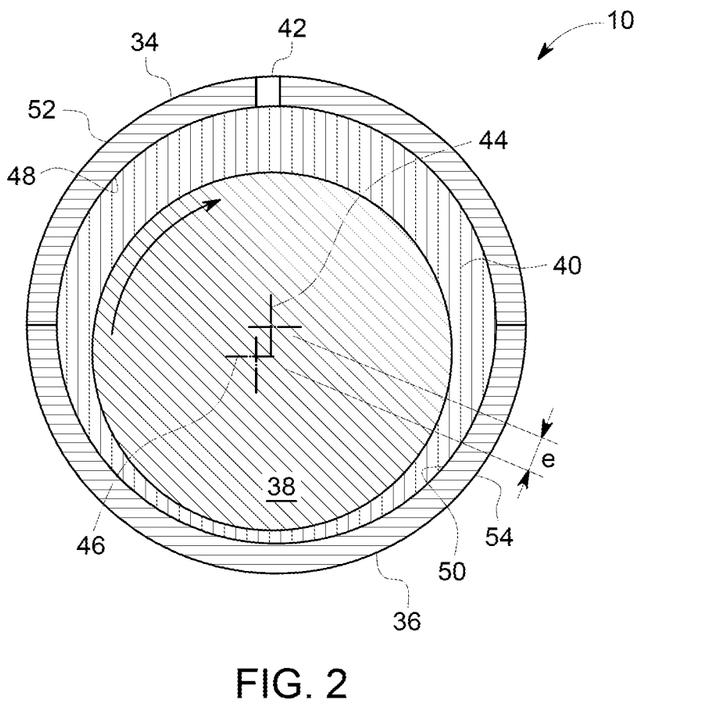
FIG. 2 is a front cross-sectional view of an embodiment of a journal bearing system that may be disposed within the reciprocating engine shown in FIG. 1 in accordance with aspects of the present disclosure.

Turning now to FIG. 2, the figure is a front view illustrating an embodiment of the journal bearing system 10. The illustrated embodiment includes two bearings 34 and 36 surrounding a journal or shaft 38. Oil or lubricant 40 may be disposed between the bearings 34, 36 and the journal 38. The oil 40 may enter and or exit the bearing system 10 via one or more oil ports 42. In use, the journal bearings 34, 36 may support journals 38 such as crankshafts, camshafts, piston shafts, flywheel shafts, and so on, as the journals 38 rotate about certain axes, such as axis 44, 46. Axis 44 is representative of an axis concentric with the center of a circle formed by the bearings or shells 34, 36, while axis 46 is representative of a displacement axis caused by the displacement of the journal 38 during rotative operations, creating an eccentricity e. The bearings 34, 36 may be disposed in a variety of housings (not shown) depending on where in the engine 11 the bearings 34, 36 may be located.

As the journal 38 rotates inside of the bearings 34, 36, a pressurized lubricant film of the oil 48 may be generated by the journal 38 rotation, providing for a hydrodynamic journal bearing system 10. During operations, the journal 38 may experience certain wear and tear. For example, the journal 38 may contact the bearings 34, 36 at inner surfaces 48, 50 which may cause wear and tear on the bearings 34, 36. Outside surfaces 52, 54, may not experience much, if any wear and tear. As more and more operating hours accumulate, the bearings 34, 36 may eventually need replacing. Bearings 34, 36 may accumulate wear and tear differently based on operating conditions. For example, engine 11 start-stops may result in higher levels of bearing 34, 36 wear when compared to the engine 11 operating at steady state (e.g., base load) conditions. In some maintenance programs for the power system 8, the bearings 34, 36 may be replaced at a certain number of operating hours for the engine 11 irrespective of the actual wear on the bearings 34, 36. The techniques described herein may provide for predictive actual wear on the bearings 34, 36 and/or the journal 38. Accordingly, the lifecycle and maintenance schedule for the bearings 34, 36 and the journal 38 may be improved. Advantageously, the predicted actual wear and tear on the bearings 34, 36 and/or the journal 38 may be within +/−7% of observed actual wear and tear, thus providing for improved derivation of remaining life, and thus more efficient maintenance schedules.

Figure 3:
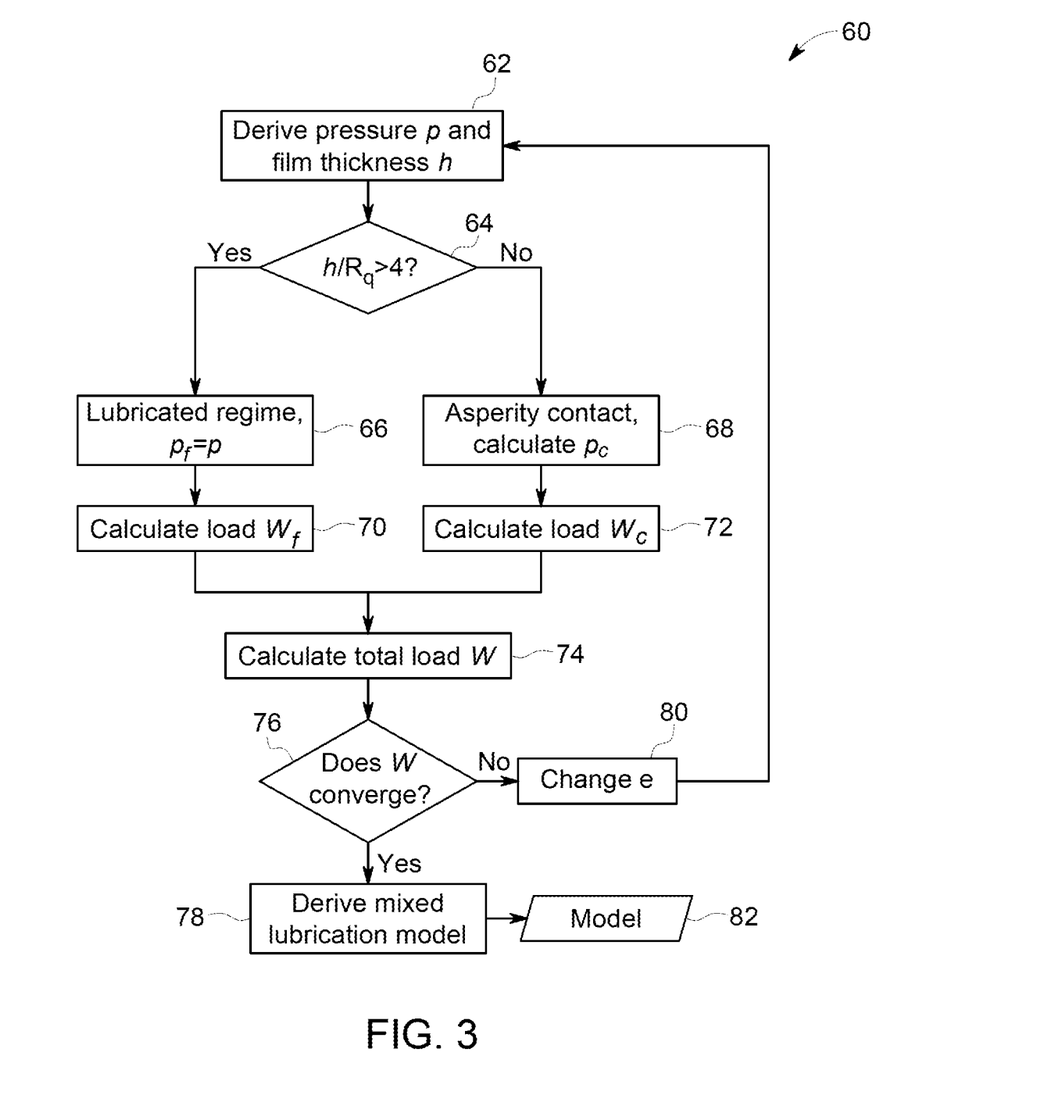
FIG. 3 is a flowchart of an embodiment of a process suitable for deriving a mixed lubrication model for the journal bearing system of FIG. 2 in accordance with aspects of the present disclosure.

FIG. 3 is a flowchart illustrating an embodiment of a process 60 suitable for deriving a mixed lubrication model. The process 60 may be implemented as computer code or instructions stored in the memory 30 and executable via the processor 28. Additionally or alternatively, the process 60 may be implemented in hardware, such as in a custom chip, FPGA chip, and so on. In the depicted embodiment, tribology theory may be used to derive (block 62) a pressure p and a film thickness h. For example, Reynold's equation and elastic deformation equations may be used to derive p(x,y) and h(x,y) along x and y axis where the x axis may include a circumference for the journal 38 and the y axis may include a length for the journal 38. The process 60 may then derive (decision 64) if the film thickness h divided by a root mean square roughness (Rq) for the journal surface is greater than a constant, such as 4. If the film thickness h divided by Rq is greater than 4 (decision 64), then the process 60 may determine (block 66) that the journal 38 is operating under a lubricated regime and thus, that the pressure p is equivalent to a fluid pressure $p_f$. Otherwise, there is likely a contact between the journal 38 and the bearings 34, 36 and thus, the process 60 may derive (block 68) an asperity contact pressure $p_f$. For example, the Greenwood-Tripp asperity contact model may be used to derive $p_c$. It is to be understood that the constant of 4 is one example. Constants larger than 4 may provide for situations where asperity contact is more prevalent, and constants smaller than 4 may provide for situations having less asperity contact.

The Greenwood-Trip asperity contact model gives a general theory of contact between two rough plane surfaces. The model shows that the load and the area of contact remain almost proportional, independently of the detailed mechanical and geometrical properties of the asperities. Further, a single-rough-surface Greenwood-Trip asperity contact model can always be found which will predict the same laws as a given two-rough-surface model.

Figure 4:
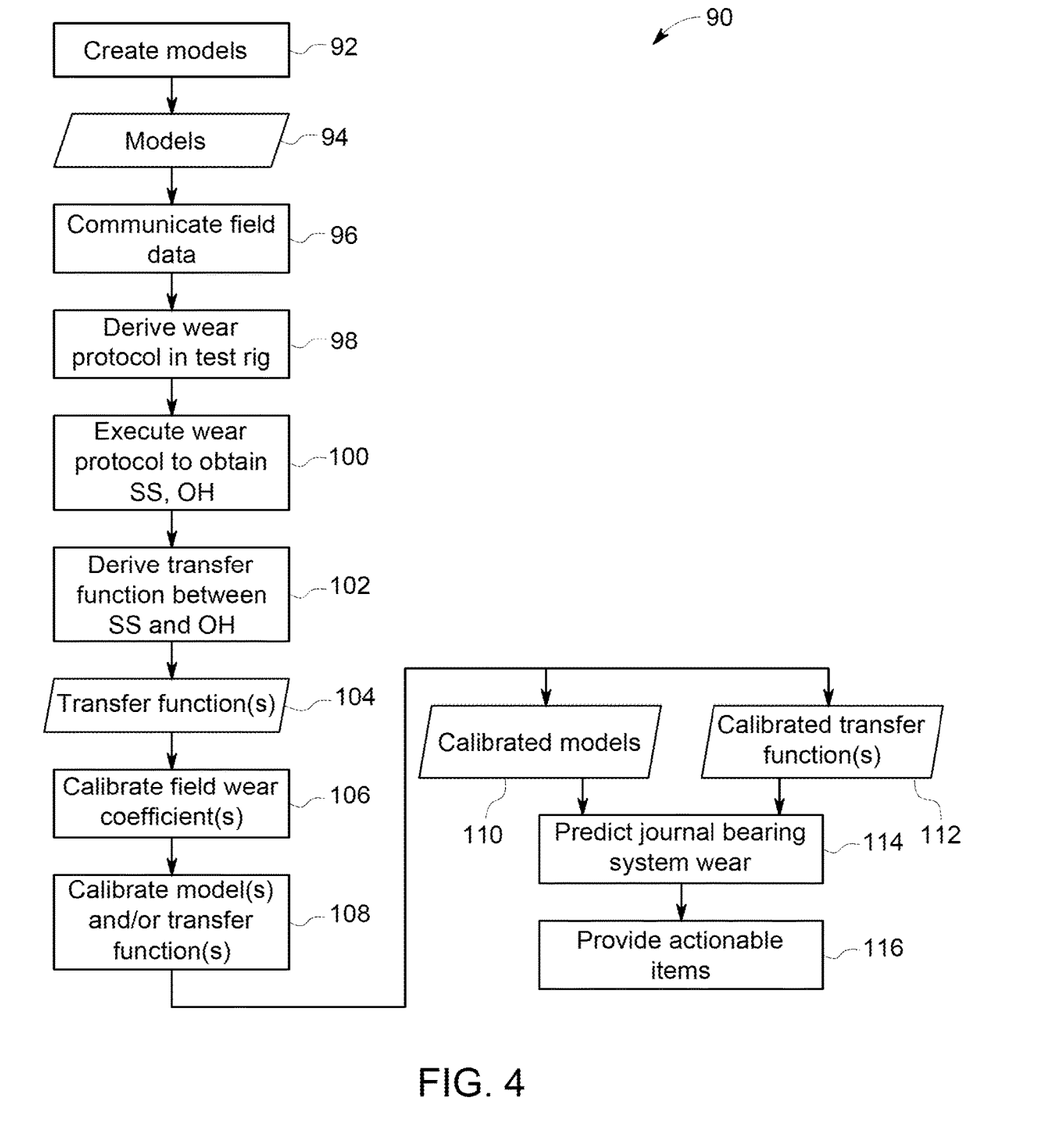
FIG. 4 is a flowchart of an embodiment of a process suitable for deriving one or more calibrated models to determine journal system wear in accordance with aspects of the present disclosure.

Based on decision 64, the process 60 may then calculate a load $W_f$ (block 70) or a load $W_c$ (block 72) via equations $W_f = \iint p_f(x, y) dx\, dy$ and $W_c = \iint p_c(x,y) dx\, dy$, respectively. A total load W may then be calculated (block 74) as $W = W_f + W_c$. If the process 60 derives that W converges (decision 76) to an applied load, for example, by looking at field and or simulation data for applied load, e.g., bearing 34, 36 load and/or journal 38 load, the process 60 may derive (block 78) that a mixed lubrication model is derivable. Otherwise, the process 60 may change eccentricity e (block 80) and loop to block 62. The process 60 may then derive (block 78) a mixed lubrication model 82. For example, the mixed lubrication model 82 may include the equation $$\delta = K_1 * \frac{p_c}{H} * v$$

where δ is a wear in micrometers (μm), $K_1$ is a calibration parameter, H is a bearing 34, 36 hardness, and v is a linear relative velocity for the journal 38. By executing process 60, the techniques described herein may provide for a more accurate mixed lubrication model 82 that incorporates both lubricated regimes as well as asperity contact modeling to derive wear. The model 82 may then be used, as described in more detail below with respect to FIG. 4, to more accurately predict wear based on number of start-stops and/or steady state operating hours for the engine 11.

FIG. 4 is a flowchart illustrating an embodiment of a process 90 suitable for predicting wear and tear for the journal bearing system 10. The process 90 may be implemented as computer code or instructions stored in the memory 30 and executable via the processor 28. Additionally or alternatively, the process 90 may be implemented in hardware, such as in a custom chip, FPGA chip, and so on. In the depicted embodiment, the process 90 may first create (block 92) one or more models 94, such as physics-based models of the journal bearing system 10 and/or power production system 8. The physics-based models may simulate operations of the journal bearing system 10 and/or power production system 8. For example, one of the models 94 may include model 82 described above. Other models 94 may include computational fluid dynamic (CFD) models, thermodynamic models, abrasion models, and so on, may be used to model the behavior of the oil 40, the bearings 34, 36, and/or the journal 38 to determine expected temperatures (e.g., oil temperature, temperatures at various sections of the bearings 34, 36 and the journal 38), pressures (e.g., oil pressure, pressures experienced by the bearings 34, 36 and the journal 38), flow rates (e.g., oil flow rate into/out of the bearing system 10), speeds (e.g., rotational journal speed), clearances (e.g., distance between the journal 38 and the bearings 34, 36), expected contact between the journal 38 and the bearings 34, 36, and the like. Additionally, oil 40 properties such as viscosity, temperature, isothermal compressibility, interfacial tension, and the like, may be modeled. The power production system 8 models may include models detailing speed, torque, power production, temperature of various components, pressures, flow rates, and so on, of the various components.

The models 94 may additionally take into account material make up for the bearings 34, 36 and journal 38, as well as certain geometries and/or architectures of the bearing system 10, such as eccentricity e, oil clearance, crush height, journal diameter, journal shape (e.g., circular, concave, convex, tapered), and so on. In certain embodiments, the journal bearing system models 94 may take as input start-stop (SS) operating hours and steady-state (OH) operating hours to increase accuracy. That is, rather than simply input the number of operating hours, the models 94 may receive as input SS hours of operation and OH hours of operation, and then derive wear. For example, physics-based models may model degradation due to heat, abrasion, abutment of journal 34 against bearings 34, 36, oil viscosity, pressures, flow rates, temperatures, speeds, and so on. The degradation may thus be indicative of wear. That is, successive degradation is representative of cumulative wear. Accordingly, wear and remaining life may be determined for the bearings 34, 36, the journal 38, and/or the oil 40.

In certain embodiments, the process 90 may improve accuracy by using field data. The field data may provide for the derivation of certain test procedures that more accurately may derive one or more transfer functions as well as calibration coefficients, and described in more detail below. Accordingly, the process 90 may communicate the field data (block 96), for example via wired or wireless techniques. The field data may include real-time data from the sensors 23 and/or instrumented journal bearing system 10 embodiments, as well as data from logs stored in the ECU 25 and/or other systems. As mentioned earlier, the data may include temperatures, pressures, fluid flows, clearances, operating hours, and/or start-stops for the components of the system 8.

The process 90 may then derive a wear protocol (block 98), such as a journal bearing system wear protocol suitable for studying how SS and OH hours may affect the various components of the journal bearing system 10. For example, the test rig 32 may include mechanical systems to operate a test journal bearing system, for example, by operating the test journal bearing system at various speeds, accelerations, decelerations, loads, clearances, temperatures, pressures, fluid flows, and so on.

TABLE 1

| | J624 Conrod (e.g., connecting rod) Bearing Conditions | J624 Test Protocol | Generic Test Protocol | Units |
|---|---|---|---|---|
| Bearing Diameter | 183 | 48 | 48 | mm |
| Journal Speed | 1500 | 5500 | 2750 | RPM |
| Surface Speed | 14.37 | 14.45 | 7.25 | m/s |
| Journal Acc. | 0.898 | 0.7 | 0.7 | m/s² |
| Jour Dec. | 0.240 | 0.7 | 0.7 | m/s² |
| Max. Bearing Unit load | 58.0 | 58.6 | 45 | MPa |
| Bearing Clearance | 0.183 | 0.048 | 0.048 | mm |
| Oil Inlet Temp. | 80 | 80 | 90 | C. ° |
| Load Acc./Dec. | 0.40 | 11.6 | 11.6 | MPa/sec |

Table 1 above is illustrative of an example wear protocol (second column) suitable for modeling a J624 engine bearing field conditions (first column). The J624 engine bearing has a diameter of 183 millimeters (mm), while the test bearing used in the wear protocol has a diameter of 48 millimeters (mm). Indeed, the wear protocol for larger sized bearings may test a smaller bearing and provide results that would be indicative of testing the larger sized bearing. The wear protocol, for example, may operate the smaller test bearing at faster journal speeds, and/or accelerations to provide for wear similar to the larger sized bearing. Also shown is a generic wear protocol (third column) that may be customized to a variety of bearing types and sizes.

The wear protocol may then be executed (block 100) via the test rig 32, for example, to observe or obtain SS and/or OH wear at various operating times. For example, the test bearing may be operated at start-stop conditions and then tested to obtain SS wear. Likewise, the test bearing may be operated at steady state conditions and then tested to obtain OH wear. Similarly, the test bearing may be operated at both start-stop conditions and steady state conditions and then tested to obtain a combination of SS and OH wear. To operate at test start-stop conditions and turning now to FIG. 5, the test rig 32 may apply certain speeds and/or loads for a desired time.

Figure 5:
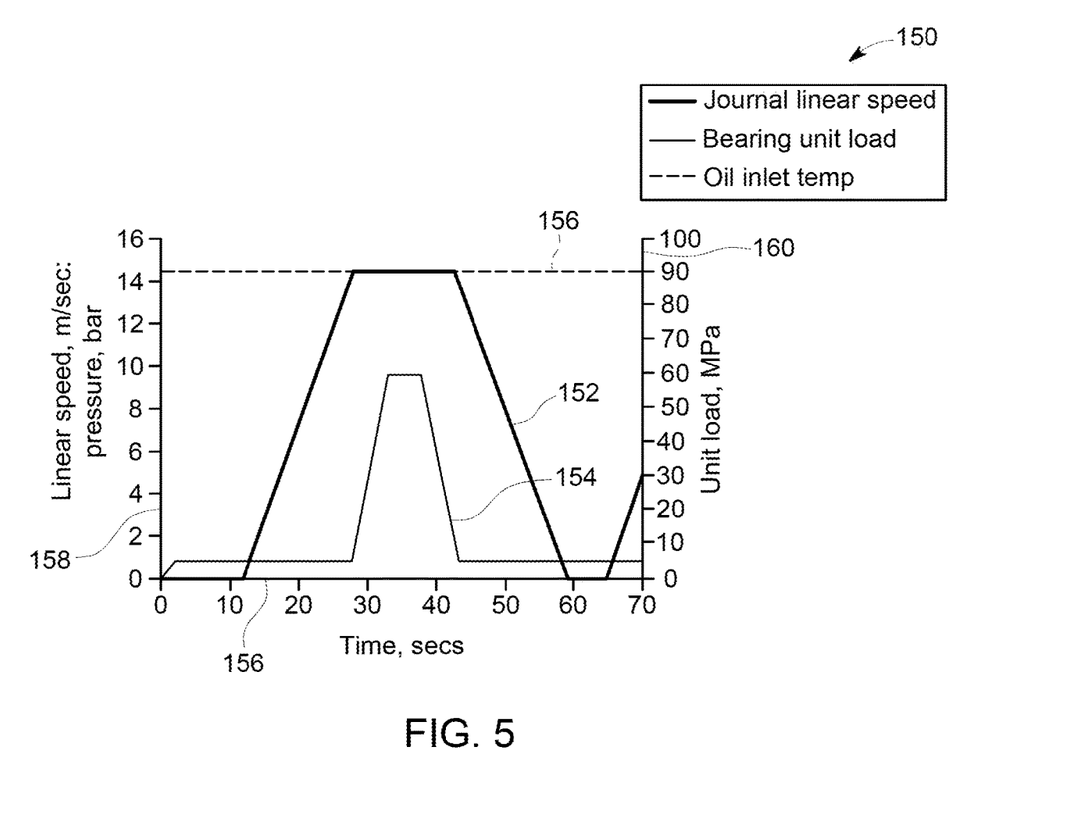
FIG. 5 is a view of a journal bearing system profile embodiment in accordance with aspects of the present disclosure.

As shown in an example bearing system profile 150 of FIG. 4, the test rig 32 may simulate start-stop conditions by applying a journal speed profile 152, a bearing unit profile 154, and an inlet oil temperature profile 156. The profiles 152, 154, 156 may be executed by the test rig 32 at a desired time range shown in x-axis 156. Y-axis 158 shows values for journal linear speed in m/s and bearing unit load in MPa. Y-axis 160 shows temperature in C°. By following the profiles 152, 154, 156, one start-stop event may be modeled. Accordingly, multiple start-stop events may be modeled by running the profiles 152, 154, 156 multiple times. Steady state conditions may be modeled by operating the test rig 32, for example, at constant speed, such as the journal speed, surface speed, or combination thereof. Likewise, constant bearing loads may be tested during steady state testing. Test steady state operations, like field steady state operations, may be measured in minutes and/or hours.

Turning now back to FIG. 4, the process 90 may derive (block 102) one or more transfer functions 104. Each of the transfer functions 104 may be based on the following equations:

$\delta = f_1(SS)$ where $\delta$ is representative of wear, for example, in micrometers (μm) and $f_1$ is a function that takes as input the number of start-stops to arrive at the wear $\delta$.

$\delta = f_2(OH)$ where $\delta$ is representative of wear and $f_2$ is a function that takes as input the number of steady state operating hours to arrive at the wear $\delta$.

The transfer function 104 suitable for deriving a number of start-stops based on either wear $\delta$ and/or steady-state operating hours may then be defined as:

$SS = f_1^{-1}(\delta) = f_1^{-1}(f_2(OH))$ where $f_1^{-1}$ is the inverse function to $f_1$.

Accordingly, the number of start-stops may be derived based on knowing the number of steady state operating hours and/or based on a known wear, and vice versa. Indeed, the transfer function 104 shown above enables for the calculation of wear due to the number of start-stops, due to the number of steady state operating hours, or a combination thereof. To provide for added accuracy, the process 90 may calibrate (block 106) certain field wear coefficients and apply the calibrated coefficients to the models(s) 94 and/or transfer function(s) 104 to derive and calibrate (block 108) calibrated models 110 and/or transfer functions 112, as further detailed below. Accordingly, log data including SS and/or OH may be for the engine 11 may be retrieved, and/or similar data provided real-time, and used to predict (block 114) a more accurate wear for components of the journal bearing system 10 (e.g., bearings 34, 36, journal 38, oil 40) via the calibrated models 110 and/or transfer functions 112. More specifically, the ECU 25 may solve for wear $\delta$ via the calibrated models 110 and transfer functions 112 by using SS and/or OH data as inputs. Based on the predictive wear $\delta$, the process 90 may then provide (block 116) certain actionable item, such as alarms/alerts, improved maintenance schedules, and the like. For example, if the predictive wear $\delta$ exceeds a threshold, and/or a growth rate, alarms/ alerts may be provided. Likewise, maintenance schedules may be based on the predictive wear δ as opposed to number of operating hours for the engine 11. In this manner, life and operations for the engine system 8 may be improved.

Figure 6:
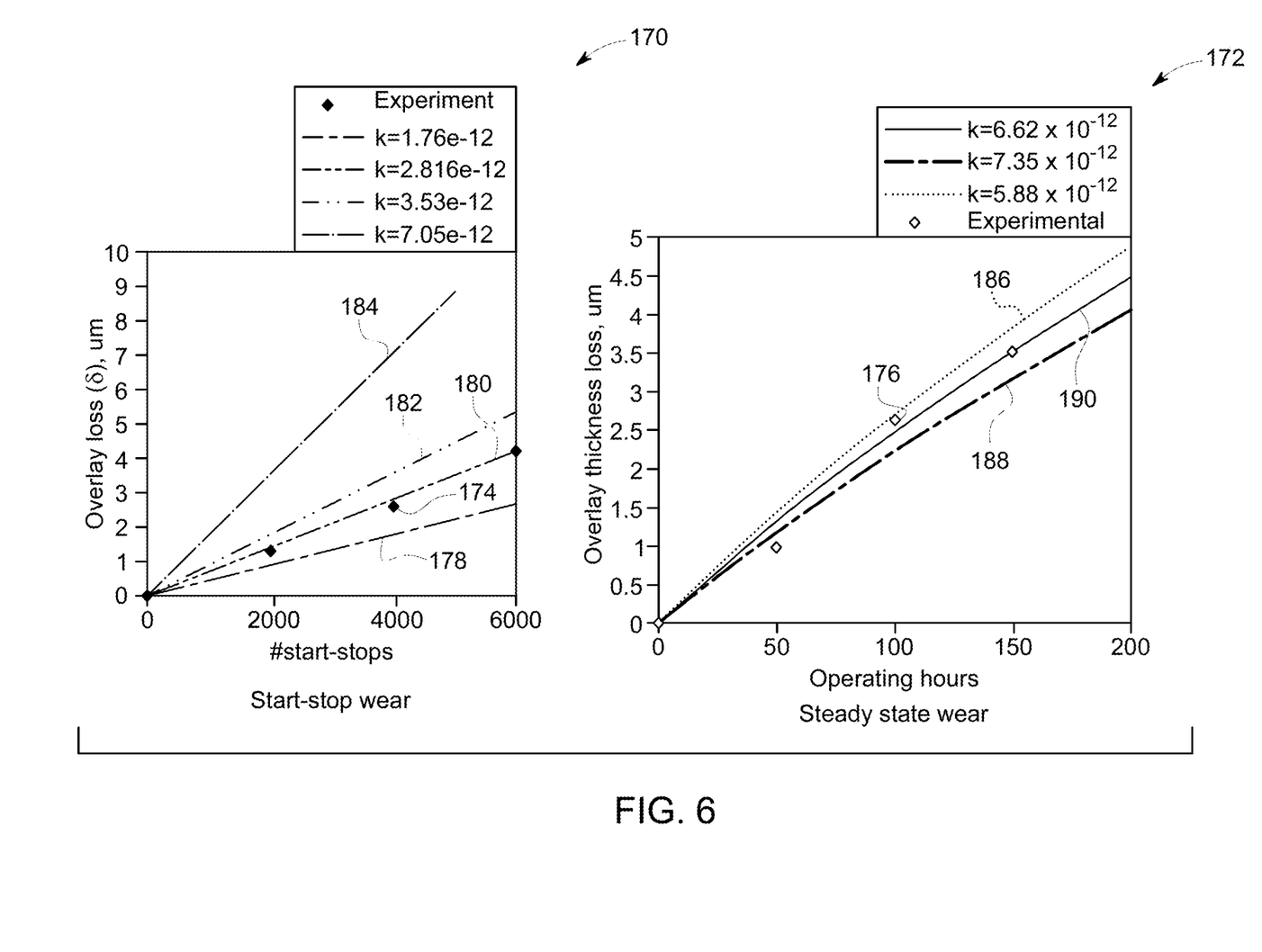
FIG. 6 is a view of graph embodiments depicting certain calibration parameters suitable for calibrating journal system wear models.

FIG. 6 illustrates example graphs 170, 172, showing calibration of parameters K based on experimental and/or field data 174, 176, respectively. As mentioned earlier, the models 94 may include calibration parameters K suitable for calibration certain models. For example, the wear equation $\delta = K_1 * p_c/H * v$ described above includes $K_1$ as a calibration parameter. The calibration parameters K (e.g., $K_1$) may be calibrated by applying certain techniques, such as statistical techniques (e.g., linear regression, non-linear regression, data mining [e.g., k-means clustering and the like]), onto the data 174, 176. For example, graph 170 shows calibration parameters 178, 180, 182, and 184 that may be used, but in the example, calibration parameter 180 appears to fit the data 174 with improved accuracy. Accordingly, the calibration parameter 180 may be used to calibrate models 94, thus better "fitting" the experimental and/or field use data for start-stop wear.

Likewise, graph 172 shows calibration parameters 186, 188, and 190 that may be used, but in the example, calibration parameter 190 appears to fit the data 176 with improved accuracy. Accordingly, the calibration parameter 190 may be used to calibrate models 94, thus better "fitting" the experimental and/or field use data for steady state wear. The calibrations may then be applied, for example, to the models 94 to derive the calibrated models 110. By calibrating the models, the techniques described herein may increase predictive accuracy.

Figure 7:
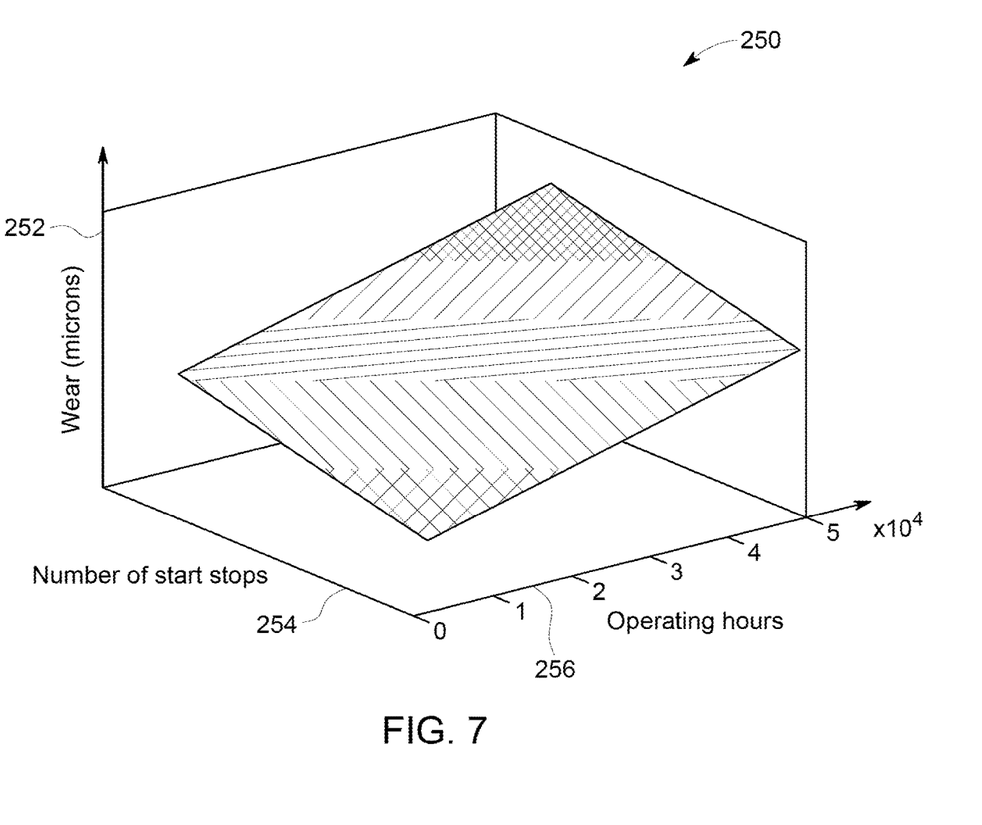
FIG. 7 is a view of a calibrated graph embodiment. The graph includes a wear axis (in microns), a number of start-stop axis and an operating hours axis.

Turning now to FIG. 7, the figure illustrates an embodiment of a calibrated graph 250 that may be derived via the models 110 and applied to find a wear based on a number of start-stops, steady state operating hours, or a combination thereof. More specifically, the graph 250 includes a wear (in microns) axis 252, a number of start-stop axis 254, and an operating hours axis 256. A process, such as the process 90, may apply the graph 250 as a "lookup" graph or table suitable for more quickly deriving wear based on the number of start-stops, steady state operating hours, or the combination thereof. The graph 250 may be created by combining the number of start stops with steady state operating hours as describe above, and then by calibrating the results, for example, via field wear data as described earlier with respect to calibration parameters K.

Technical effects of the disclosed embodiments include providing systems and methods for.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
    executing a wear protocol to derive at least one of: a start-stop (SS) wear, or a steady-state operating hours (OH) wear, or a combination thereof, of a test journal bearing system;
    deriving a transfer function configured to determine a total wear for the test journal bearing system based on at least one of: the SS wear, or the OH wear, or the combination thereof;
    observing operations of an engine via one or more sensors to derive at least one of: a number of start-stops, or steady-state operating hours, or a combination thereof;
    determining a determined journal bearing system wear based on applying a physics-based model of a journal bearing system and the transfer function to at least one of: the number of start-stops, or the steady-state operating hours, or the combination thereof; and
    executing one or more actionable items on the engine based on the determined journal bearing system wear.

2. The method of claim 1, wherein the transfer function comprises an $SS = f_1^{-1}(f_2(OH))$ where $f_1^{-1}$ comprises an inverse function to $f_1$.

3. The method of claim 2, wherein the transfer function comprises an $SS = f_1^{-1}(\delta) = f_1^{-1}(f_2(OH))$, wherein $\delta = f_1(SS)$, wherein $\delta = f_2(OH)$ and wherein $\delta$ is representative of wear.

4. The method of claim 1, wherein the physics-based model comprises a field-calibrated model.

5. The method of claim 4, comprising deriving the field-calibrated model via data received from the sensors during field observations of engine operations to derive one or more calibration parameters K.

6. The method of claim 5, wherein deriving the one or more calibration parameters K comprises applying at least one of: a linear regression, a non-linear regression, or a data mining, or a combination thereof, to the data received via the sensors.

7. The method of claim 1, wherein the physics-based model of the journal bearing system comprises a mixed lubrication model that comprises both a lubricated regime and an asperity contact regime.

8. The method of claim 7, wherein the lubricated regime comprises a $p_f = p$ where $p_f$ is equivalent of fluid pressure and p is equivalent to pressure, and wherein the asperity contact regime comprises a $p_c$ where $p_c$ comprises an asperity contact pressure.

9. The method of claim 8, comprising deriving the asperity contact pressure via a Greenwood-Tripp asperity contact model.

10. The method of claim 1, wherein determining the determined journal bearing system wear comprises determining at least one of: a journal bearing wear, a journal wear, or an oil wear, or a combination thereof.

11. The method of claim 1, wherein the transfer function comprises a field-calibrated transfer function.

12. The method of claim 11, comprising deriving the field-calibrated transfer function via data received from the sensors during field observations of engine operations to derive one or more calibration parameters K.

13. A system, comprising:
    an electronic control unit (ECU) comprising a memory or storage device storing one or more processor-executable executable routines; and
    one or more processors configured to execute the one or more executable routines which, when executed, cause acts to be performed comprising:
        controlling operations of an engine;
        observing operations of the engine via one or more sensors to derive at least one of: a number of start-stops, or steady-state operating hours, or a combination thereof;
        determining a determined journal bearing system wear based on applying a physics-based model of a journal bearing system and a transfer function to at least one of: the number of start-stops, or the steady-state operating hours, or the combination thereof; and executing one or more actionable items on the engine based on the determined journal bearing system wear.

14. The system of claim 13, wherein the transfer function comprises an $SS=f_1^{-1}(f_2(OH))$ where $f_1^{-1}$ comprises an inverse function to $f_1$.

15. The system of claim 13, wherein the physics-based model comprises a field-calibrated model.

16. The system of claim 13, wherein the physics-based model of the journal bearing system comprises a mixed lubrication model that comprises both a lubricated regime and an asperity contact regime.

17. The system of claim 13, wherein executing the actionable items on the engine comprises at least one of: raising an alarm, turning off the engine, lowering engine speed, or adding a database log entry, or a combination thereof.

18. The system of claim 13, wherein the transfer function comprises a field-calibrated transfer function.

19. The system of claim 13, comprising the engine having the ECU.

20. The system of claim 19, wherein the engine comprises a reciprocating internal combustion engine.

* * * * *